(12) United States Patent
Srivastava et al.

(10) Patent No.: US 9,306,812 B2
(45) Date of Patent: Apr. 5, 2016

(54) SYSTEM AND METHOD FOR PROVIDING NETWORK APPLICATION PERFORMANCE MANAGEMENT IN A NETWORK

(75) Inventors: Saurabh Srivastava, Ottawa (CA); Ravishankar Ravindran, Ottawa (CA); Francois Blouin, Gatineau (CA)

(73) Assignee: RPX Clearinghouse LLC, San Francisco, CA (US)

( * ) Notice: Subject to any disclaimer, the term of this patent is extended or adjusted under 35 U.S.C. 154(b) by 1241 days.

(21) Appl. No.: 11/867,288

(22) Filed: Oct. 4, 2007

(65) Prior Publication Data

US 2009/0013070 A1 Jan. 8, 2009

Related U.S. Application Data

(60) Provisional application No. 60/948,017, filed on Jul. 5, 2007.

(51) Int. Cl.
*G06F 15/173* (2006.01)
*H04L 12/24* (2006.01)
*H04L 12/26* (2006.01)

(52) U.S. Cl.
CPC ............ *H04L 41/5038* (2013.01); *H04L 43/12* (2013.01)

(58) Field of Classification Search
CPC ........................... H04L 41/5038; H04L 43/12
USPC ................... 709/224, 223, 222, 226
See application file for complete search history.

(56) References Cited

U.S. PATENT DOCUMENTS

| | | | |
|---|---|---|---|
| 5,881,237 A * | 3/1999 | Schwaller et al. ............ | 709/224 |
| 5,937,165 A * | 8/1999 | Schwaller et al. ............ | 709/224 |
| 6,359,976 B1 * | 3/2002 | Kalyanpur et al. ........... | 379/134 |
| 6,363,056 B1 * | 3/2002 | Beigi .................. | H04L 12/2697 370/252 |
| 6,397,359 B1 * | 5/2002 | Chandra et al. ............... | 714/712 |
| 6,434,613 B1 * | 8/2002 | Bertram et al. ............... | 709/223 |
| 6,754,664 B1 * | 6/2004 | Bush ............................ | 707/102 |
| 6,801,940 B1 * | 10/2004 | Moran et al. .................. | 709/224 |
| 6,928,471 B2 * | 8/2005 | Pabari et al. .................. | 709/223 |
| 6,970,924 B1 * | 11/2005 | Chu et al. ...................... | 709/224 |
| 7,167,860 B1 * | 1/2007 | Black et al. .................... | 707/10 |
| 7,222,190 B2 * | 5/2007 | Klinker et al. ................ | 709/238 |

(Continued)

*Primary Examiner* — Hassan Kizou
*Assistant Examiner* — Abdelnabi Musa
(74) *Attorney, Agent, or Firm* — Christopher & Weisberg, P.A.

(57) ABSTRACT

The present invention relates to a system and method for network performance management for monitoring performance of network applications. The system comprises a transmitter for sending one or more types of probe packets to the network, a receiver for receiving the one or more network probe packets from the network and for receiving one or more network application performance queries from one or more network applications, a processor connected to the transmitter and the receiver and operable to process network probe packets received by the receiver to generate network performance statistics for each type of probe packet and to look up the network application performance requirements of the one or more network applications and compare the network application performance requirements with the corresponding network performance statistics to determine whether the network application should access the network. Network performance statistics may be obtained using lean packet probes, using real traffic test streams or obtaining network performance statistics from a service provider. Thus by providing a probe, lookup, feedback methodology, network parameters, or network application requirements, may be adjusted to meet performance requirements of one or more network applications.

20 Claims, 2 Drawing Sheets

(56) References Cited

U.S. PATENT DOCUMENTS

| | | | |
|---|---|---|---|
| 7,225,249 B1 * | 5/2007 | Barry et al. | 709/227 |
| 7,260,645 B2 * | 8/2007 | Bays | 709/238 |
| 7,366,790 B1 * | 4/2008 | Rustad et al. | 709/235 |
| 7,711,751 B2 * | 5/2010 | Kelley | H04L 41/046 707/791 |
| 8,547,855 B1 * | 10/2013 | Zingale | H04L 41/142 370/241 |
| 8,763,076 B1 * | 6/2014 | Satish | G06F 21/00 713/166 |
| 2002/0120727 A1 * | 8/2002 | Curley et al. | 709/223 |
| 2002/0174222 A1 * | 11/2002 | Cox | 709/224 |
| 2002/0198985 A1 * | 12/2002 | Fraenkel et al. | 709/224 |
| 2003/0097438 A1 * | 5/2003 | Bearden et al. | 709/224 |
| 2003/0204619 A1 * | 10/2003 | Bays | 709/238 |
| 2004/0088405 A1 * | 5/2004 | Aggarwal | H04L 41/069 709/224 |
| 2004/0109410 A1 * | 6/2004 | Chase et al. | 370/229 |
| 2004/0172467 A1 * | 9/2004 | Wechter et al. | 709/224 |
| 2004/0193709 A1 * | 9/2004 | Selvaggi et al. | 709/224 |
| 2005/0076154 A1 * | 4/2005 | Chambliss et al. | 710/1 |
| 2005/0262237 A1 * | 11/2005 | Fulton et al. | 709/224 |
| 2006/0117098 A1 * | 6/2006 | Dezonno et al. | 709/223 |
| 2007/0271375 A1 * | 11/2007 | Hwang | 709/224 |
| 2007/0294399 A1 * | 12/2007 | Grossner et al. | 709/224 |
| 2008/0104231 A1 * | 5/2008 | Dey et al. | 709/224 |
| 2008/0189776 A1 * | 8/2008 | Constable | 726/7 |
| 2009/0182874 A1 * | 7/2009 | Morford et al. | 709/224 |
| 2009/0187968 A1 * | 7/2009 | Roese et al. | 726/1 |

* cited by examiner

SYSTEM AND METHOD FOR PROVIDING NETWORK APPLICATION PERFORMANCE MANAGEMENT IN A NETWORK

RELATED APPLICATION

This application claims the benefit of U.S. Provisional Application No. 60/948,017 filed on Jul. 5, 2007. The entire contents of the provisional application are incorporated herein by reference.

FIELD OF INVENTION

The present invention relates to network application performance management, and in particular, to a system and method for providing performance management for one or more real-time applications in a network.

BACKGROUND

Managing a network's performance to support a wide range of network-based real-time applications is a challenging task. Network applications are known to cause a significant percentage of network outages and service degradations, resulting in a loss of productivity and revenue for the network operator. In particular, the use of packet based, real-time applications on enterprise network infrastructures has increased substantially. Typically, such real time applications have specific performance requirements, including stringent Quality of Service (QoS) and Quality of Experience (QoE) requirements. With potentially hundreds of network accessible applications being operated in a given network and each application having its own network performance requirements, there is a need to be able to configure a network to meet the needs of these applications, while preventing network outages and service degradation. One known technique is to adjust network parameters from a network perspective to optimize the performance of the nodes and thus prevent the network from being excessively congested. However such network centric tuning cannot optimize network application specific performance nor can it isolate network application performance related issues. Since metrics are typically generated by the service provider on a peer basis, network application specific performance metrics cannot be obtained or configured.

Accordingly, there is a need for a system and method that can overcome the performance disconnect between the network and application performance. Specifically, there is a need for improved network application aware monitoring and optimization.

SUMMARY

It is an object of the present invention to obviate or mitigate at least one of the abovementioned problems.

According to one aspect of the present invention, there is provided a method for monitoring performance of network applications. The method comprises transmitting, receiving and processing packet probes into network performance statistics, looking up performance requirements for the network application, comparing the network performance statistics with the network application's performance requirements and notifying the network application whether the network application requirements are met by the network.

The step of transmitting and receiving network performance statistics may comprise transmitting differentiated-services encoded lean packet probes, on a periodic or as needed basis, or transmitting real application test traffic streams. Alternatively, network performance statistics for various Class of Services may be obtained from a network service provider who may provide this information as a revenue generating service. In response, a network operator may adjust network performance parameters accordingly, or a network application may respond appropriately depending on whether performance requirements are met. Thus by providing a probe, lookup, response methodology, network parameters, or network application requirements may be adjusted to meet performance requirements of one or more network applications.

According to another aspect of the present invention, there is provided a network performance management system for monitoring performance of network applications, the system comprises a transmitter for sending one or more types of network probe packets to the network, a receiver for receiving the one or more types of network probe packets from the network and for receiving one or more network application performance queries from network applications, a processor connected to the transmitter and the receiver and operable to process network probe packets received by the receiver to generate network performance statistics for each type of probe packet and to look up the network application performance requirements of the one or more network applications and compare the network application performance requirements with the corresponding network performance statistics to generate application performance information for transmission by the transmitter. Thus systems and methods are provided for monitoring network performance requirements based on network application requirements, and managing network performance accordingly.

Other aspects and features of the present invention will become apparent to those ordinarily skilled in the art upon review in conjunction with the accompanying figures.

DESCRIPTION OF DRAWINGS

Embodiments of the present invention will now be described, by way of example only, with reference to the attached Figures, wherein.

DETAILED DESCRIPTION

Figure 1:
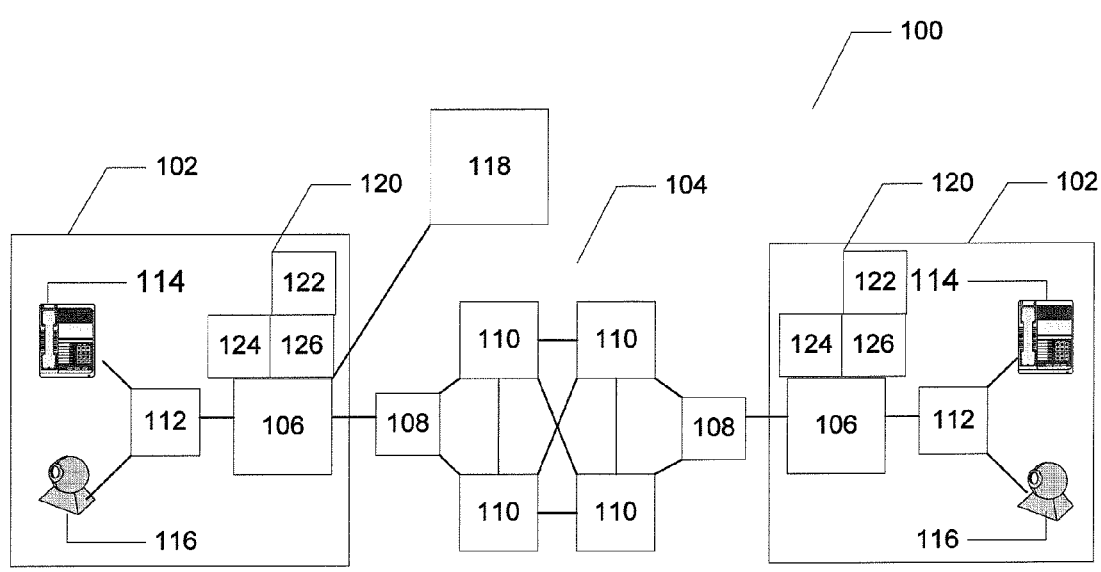
FIG. 1 illustrates a system for managing performance of network applications in a network according to an embodiment of the present invention.

Referring to FIG. 1, which shows a typical context within which embodiments of the invention are applicable, a network 100 comprises a plurality of branch offices 102 connected to a network backbone 104 via gateway routers 106 where each gateway router 106 is connected to a multi service edge (MSE) component 108 and each MSE 108 is connected to a series of core routers 110. Within each branch office 102, the gateway router 106 is internally connected to a layer 3 or layer 2 switch 112 that allows network aware applications within the branch office 102, for example real time communications applications using a Voice over IP (VoIP) phone 114 or webcam 116 to connect and utilize the network. From a network performance management perspective, a central network management system 118 is connected to the gateway router 106 to perform manual network optimization configuration or receive feedback when necessary. In embodiments of the invention, a system 120, which may be integral to the router 106, provides for a method of monitoring network performance of a network application, the system 120 comprising a transmitter 122 for sending one or more types of differentiated-services encoded network probe packets to the network, a receiver 124 for receiving the one or more types of network probe packets from the network and for receiving one or more network application performance queries from network applications, a processor 126 connected to the transmitter and the receiver and operable to process network probe packets received by the receiver to generate network performance statistics for each type of probe packet and to look up the network application performance requirements of the one or more network applications and compare the network application performance requirements with the corresponding network performance statistics to determine whether the network application should access the network. The transmitter 122 may send network probe packets in a number of ways. In a first embodiment, described below, the transmitter 122 generates a probe using lean synthetic packets to generate network performance statistics. Other embodiments using real network application traffic test streams or obtaining network performance statistics from a service provider will be described subsequently.

Thus, in a network according to a first embodiment of the present invention, running a plurality of network applications with different protocol class types, the transmitter 122, receiver 124 and processor 126 work collectively to collect and generate network performance statistics, including Quality of Service (QoS) statistics which include delay, jitter and loss for each application protocol class type. Beneficially, the transmitter 122 uses differentiated services encoded lean packet probes to generate these network probes. Specifically, the lean packet probes are sent by the transmitter 122 simultaneously for each of the different flows of distinct network application protocol classes and are used to calculate the network QoS performance statistics. Probes may be sent on a periodic or as needed basis. A benefit of using these types of probes is that a single mechanism is used to send consistent lean packet probes with short packet lengths which add minimal traffic overhead. This mechanism is also flexible, in that it can use a range of packet sizes with different class of service and traffic types that can be adapted to any application. By combining lean packet probes with the ability to configure probing frequencies, and available statistical analysis tools, such as moving average analysis, it is possible to generate reliable statistical information about the performance of various application protocol classes in a network. This approach is flexible in that it may use a range of packet sizes, with different Class of Services and traffic types that can be adapted to any application.

In an alternative embodiment of the present invention, network probe packets sent from the transmitter 122 consist of real application traffic instead of using lean packet probes. In this embodiment, network performance statistics are generated using test streams of real application traffic. Such traffic mimics a specific type of network application and generates statistics that indicate how a real session would behave if one were initiated. Specifically, simultaneous differentiated services code point (DSCP) marked test streams are used to determine the relative network performance for each network application. These streams may be sent periodically or on a needed basis to reduce the overhead on the overall network state. Furthermore, unlike the probe model, use of real application traffic triggers a response from the destination server, which provides the added benefit of obtaining round trip metrics. On the other hand, in comparison with lean packet probes, there is increased overhead in testing with a real application stream, and increased complexity involved in terms of mimicking application software required to generate such streams for each application and associated costs involved in configuration management.

In a third embodiment of the present invention, network performance statistics are received by the receiver 122 in the form of service provider statistics from the MSE provided on a periodic basis. Thus, although enterprises then have to rely on the set of performance statistics provided by the service provider, they are not required to generate performance statistics on their own systems.

This approach is attractive to the service provider as an opportunity to introduce revenue collecting value added service. Service level can be further differentiated based on, for example, the accuracy of information being provided. Granularity here would address whether the information were an average of all the delays to all the branch office sites or a full point to point matrix that would detail the point to point delays and jitter values. Granularity can be further controlled based on whether the point to point QoS matrix provided is for a particular class of service. The accuracy of these performance statistics can be controlled by the refresh rates that are associated with such a service. It should be noted that refresh rates depend on the type of QoS metric in question and whether the statistics is static or dynamic. Static parameters, such as hop counts, may not require large refresh rates. On the other hand, dynamic parameters such as throughput and delay may require frequent updates.

Figure 2:
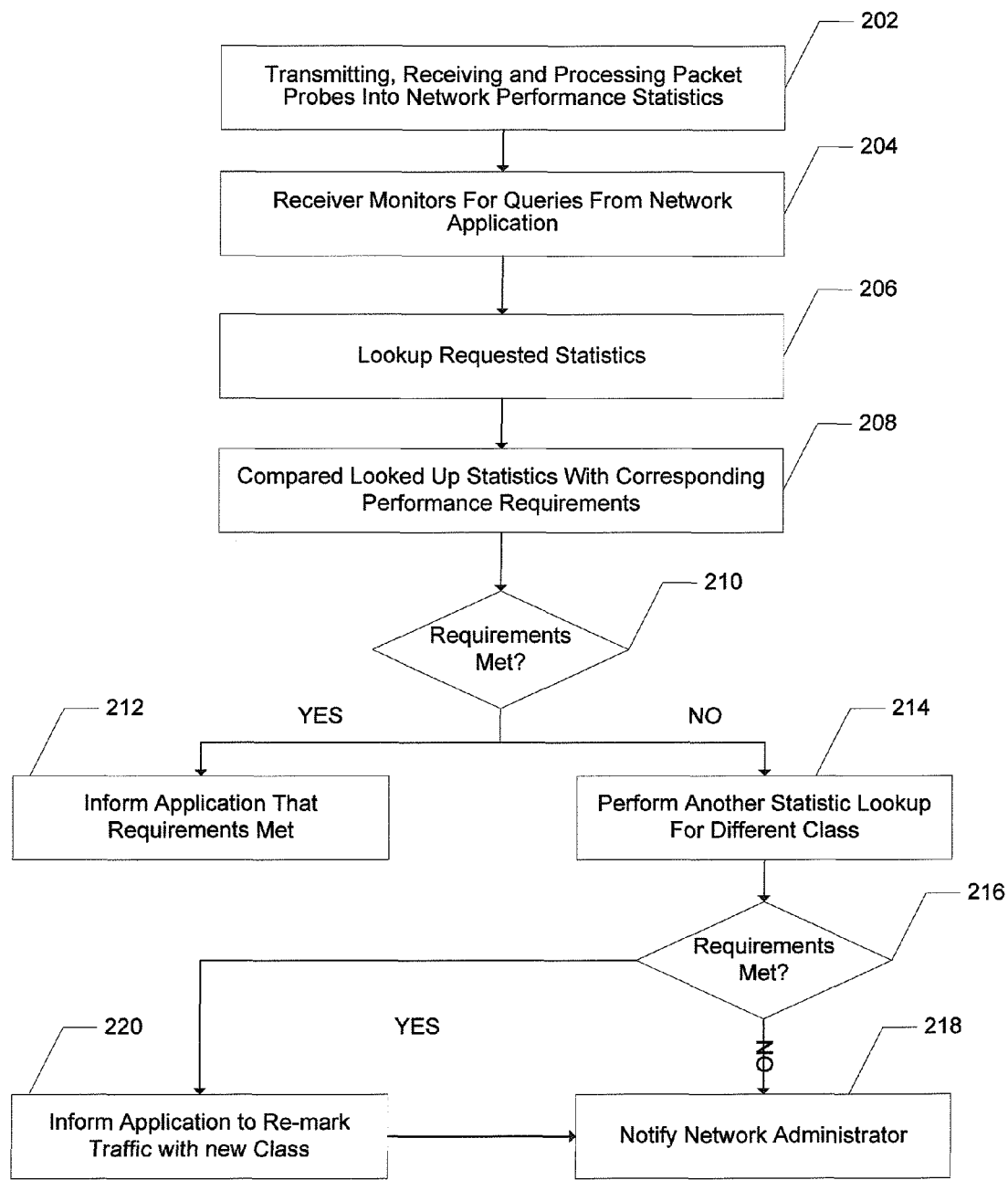
FIG. 2 is a schematic illustrating a method of network performance monitoring for managing performance of network applications in a network according to an embodiment of the present invention.

Referring to FIG. 2, showing a schematic of method steps 202-220, after transmitting, receiving and processing packet probes into network performance statistics 202, these statistics are stored according to various Differentiated-Service Classes of Service or protocols. Such statistics can be further differentiated to show peer relationships from one branch office to another. It is also possible to correlate performance statistics for multiple branch offices. Such data can be stored either locally on the gateway router or stored centrally for all branch offices to achieve scalability. Alternatively, the data may also be stored in a distributed fashion on each branch site to reduce the latency to access such information.

After storing network performance statistics, a receiver 124 monitors for queries or requests from the network application 204. Specifically, the receiver 124 receives a packet from the network application marked with the class of service required by the network application. For example, a VoIP application would mark its query packets with the VoIP class. If a particular network application falls under multiple classes, the application could query for a best available class or send a query for each class it supports. However, if no class is defined for a particular application then the class setting is set to a pre-determined default class.

Once the query packet is received by the receiver 124, the processor 126, associated with the network performance monitoring system, then performs a lookup of network performance statistics such as delay, loss and jitter targets for that particular class 206. The processor further compares network performance statistics with the network application performance requirements of that class 208 and determines if the requirements are met 210, e.g. such that the application can use the network resources without significant problems and without degrading the overall network state. If it is determined by the processor 126 that the requirements have been met, the network notifier informs the application and/or the system that requirements are met 212. The message may include notifying the application that it may use the network with the requested class.

If the requirements are not met, 210, a different application supported class 214 can be used by the processor 126. If all supported classes do not meet the requirements 216, the notifier informs the application, which then has the choice to back off and notify the network administrator that it cannot use the network 218. Alternatively, if requirements from a different supported class are met 216 then the notifier informs the application to re-mark traffic with a different DSCP 220 that it can use the network with that class and the network performance monitoring device generates new performance metrics. A benefit of this method is that it helps the network administrator meet their service level agreement (SLA) objectives. Specifically, the techniques used in this method can be used to prevent the network from becoming overly congested.

From an enterprise perspective, the network performance monitoring methods described in the present invention provide the opportunity to make applications network aware and to make networks, application aware. This potentially provides the enterprise with substantial cost savings opportunities with respect to reduction in application performance issues and or through enabling application Call Admission Control (CAC), which could potentially mitigate congestion. Furthermore, the method has minimal overhead and greater flexibility than those in the prior art. When service degradation or network outages occur, the methods provide a means to quickly isolate whether the issue is network or application or service provider related.

These methods also allow the enterprise to verify performance SLAs cost effectively thus displacing the enterprise's need to purchase expensive third party monitoring tools. The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. A network performance management system for monitoring network performance of network applications, the system comprising:
    a transmitter for sending one or more types of network probe packets to the network;
    a receiver for receiving the one or more types of network probe packets from the network and for receiving one or more network application performance queries from one or more network applications; and
    a processor in communication with the transmitter and the receiver and operable to:
        process network probe packets received by the receiver to generate real time network performance statistics for each type of probe packet, the generation being initiated upon a network application seeking access to the network;
        look up the network application performance requirements of the one or more network applications; and
        compare the network application performance requirements with the corresponding real time network performance statistics to determine whether the network application should access the network.

2. A system as defined in claim 1 wherein the transmitter uses differentiated-services encoded lean packet probes.

3. A system as defined in claim 1 wherein the transmitter uses real application test traffic streams.

4. A system as defined in claim 1 wherein the one or more network application performance queries received by the receiver are in a form of a packet marked with the class of service required by the network application.

5. A system as defined in claim 4 wherein the information from the network application performance query packet is used by the processor to look-up the appropriate network application performance requirements.

6. A network performance management system for monitoring network performance of network applications, the system comprising:
    a receiver for receiving real time network performance statistics and for receiving one or more network application performance queries from one or more network applications; and
    a processor in communication with the receiver and operable to:
        look up the network application performance requirements of the one or more network applications; and
        compare the network application performance requirements with the corresponding real time network performance statistics to determine whether the network application should access the network, the processor generating the real time network performance statistics upon a network application seeking access to the network.

7. A system as defined in claim 6 wherein the one or more network application performance queries received by the receiver are in a form of a packet marked with the class of service required by the network application.

8. A system as defined in claim 7 wherein the information from the network application performance query packet is used by the processor to look-up the appropriate network application performance requirements.

9. A method for monitoring performance of a network application, the network application using a network, the method comprising:
    transmitting, receiving and processing packet probes into real time network performance statistics, the real time network performance statistics being generated upon a network application seeking access to the network;
    monitoring for queries or requests from the network application; and
    looking up performance requirements for the network application; and
    comparing the real time network performance statistics with the network application's performance requirements.

10. A method as defined in claim 9 wherein the step of comparing the network performance statistics with the network application performance requirements comprises producing a first output to indicate whether performance requirements are met.

11. The method of claim 10 further comprising the step of adjusting network application requirements when the first output indicates the performance requirements are not met.

12. A method as defined in claim 9 wherein the step of transmitting, receiving and processing packet probes into network performance statistics is performed using differentiated-services encoded lean packet probes.

13. A method as defined in claim 9 wherein the step of transmitting, receiving and processing packet probes into network performance statistics is performed using real application test traffic streams.

14. A method as defined in claim 9 wherein the step of transmitting, receiving and processing packet probes into network performance statistics is performed by obtaining network performance statistics for various Class of Services from a network service provider.

15. A method as defined in claim 10 further comprising the step of informing the network application when the first output indicates that the performance requirements are met.

16. A method as defined in claim 15 further comprising the step of performing a lookup of performance requirements for a different class when the first output indicates that the performance requirements are not met.

17. A method as defined in claim 16 wherein the step of performing a lookup of performance requirements for a different class includes producing a second output to indicate whether performance requirements are met with the different class.

18. A method as defined in claim 17 further comprising the step of informing the network application to re-mark traffic with the different class when the second output indicates that performance requirements are met with the different class.

19. A method as defined in claim 18 further comprising the step of notifying the network administrator that performance requirements are met with the different class.

20. A method as defined in claim 17 further comprising the step of notifying the network administrator when the second output indicates that performance requirements are not met with the different class.

* * * * *